US010027096B2

(12) United States Patent
Jakkireddy et al.

(10) Patent No.: US 10,027,096 B2
(45) Date of Patent: Jul. 17, 2018

(54) SHUTTER INTERLOCK DEVICES, SYSTEMS, AND METHODS OF USE THEREOF

(71) Applicant: General Electric Company, Schenectady, NY (US)

(72) Inventors: Ayyappa Reddy Jakkireddy, Hyderabad (IN); Samir Rajauria, Agra (IN); Shravan Purohit, Secunderabad (IN); Guru Moorthy Kurra, Hyderabad (IN); Lenin Pokkula, Hyderabad (IN); Naveen Kumar, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 96 days.

(21) Appl. No.: 15/050,941

(22) Filed: Feb. 23, 2016

(65) Prior Publication Data

US 2017/0244227 A1 Aug. 24, 2017

(51) Int. Cl.
*H02B 11/24* (2006.01)
*H02B 1/14* (2006.01)

(52) U.S. Cl.
CPC .............. *H02B 11/24* (2013.01); *H02B 1/14* (2013.01)

(58) Field of Classification Search
None
See application file for complete search history.

(56) References Cited

U.S. PATENT DOCUMENTS

| | | | |
|---|---|---|---|
| 2,840,652 A | 6/1958 | Eichelberger et al. | |
| 3,610,850 A | 10/1971 | Eichelberger | |
| 3,783,208 A | 1/1974 | Davies et al. | |
| 4,002,865 A * | 1/1977 | Kuhn | H02B 11/133 200/50.22 |
| 5,097,382 A * | 3/1992 | Leach | H02B 11/127 361/615 |
| 5,200,585 A * | 4/1993 | Davies | H02B 11/12 200/50.21 |
| 5,481,075 A * | 1/1996 | Kleinecke | H02B 11/12 200/50.21 |
| 5,486,978 A * | 1/1996 | Fishovitz | H02B 11/24 200/50.21 |
| 5,641,953 A | 6/1997 | Fisher, Jr. | |
| 6,476,335 B2 * | 11/2002 | Letient | H02B 11/133 200/308 |

(Continued)

FOREIGN PATENT DOCUMENTS

| | | |
|---|---|---|
| CN | 201838930 U | 5/2011 |
| EP | 0437758 A1 | 7/1991 |

OTHER PUBLICATIONS

"Shutter Interlock for Switchgears", IPC0M000241282D, Apr. 13, 2015, pp. 1-3, The IP.com Prior Art Database.

*Primary Examiner* — Courtney Smith
(74) *Attorney, Agent, or Firm* — GE Global Patent Operation; Stephen G. Midgley

(57) ABSTRACT

A shutter interlock device for an electrical enclosure includes a shutter link defining a lock slot, an actuating member rotatably coupled to the electrical enclosure, and a sliding link. The sliding link includes a first end coupled to the actuating member, a second end opposite the first end, and a pin coupled to the second end, where a rotation of the actuating member causes the pin to selectively disengage the lock slot.

19 Claims, 5 Drawing Sheets

(56) References Cited

U.S. PATENT DOCUMENTS

| | | | |
|---|---|---|---|
| 8,054,606 B2* | 11/2011 | Morris | H01H 3/26 |
| | | | 361/115 |
| 8,604,368 B2* | 12/2013 | Kim | H02B 11/24 |
| | | | 200/50.22 |
| 8,796,570 B2* | 8/2014 | Kobayashi | H02B 11/133 |
| | | | 200/50.22 |
| 9,184,572 B2 | 11/2015 | Gao et al. | |
| 9,531,169 B2* | 12/2016 | Oneufer | H02B 1/46 |
| 9,685,282 B2* | 6/2017 | Mun | H01H 9/20 |
| 2007/0137991 A1* | 6/2007 | Kashyap | H02B 11/24 |
| | | | 200/50.22 |
| 2015/0280405 A1* | 10/2015 | Jakkireddy | H02B 11/133 |
| | | | 361/624 |

\* cited by examiner

SHUTTER INTERLOCK DEVICES, SYSTEMS, AND METHODS OF USE THEREOF

BACKGROUND

The field of the disclosure relates generally to safety devices for electrical enclosures, and, more specifically, to a shutter interlock device, system, and method to prevent manual access to voltage line terminals within an electrical enclosure.

Known electrical enclosures with switchgear equipment include a line or busbar portion and a load or circuit breaker portion. The busbar portion includes at least one busbar coupled to an electrical load through exposed voltage line terminals. Flow of current to connected loads is interruptible through at least one circuit breaker. Such known electrical enclosures also include shutters to close and prevent access to exposed voltage line terminals in the portions containing exposed busbars when circuit breakers are removed from electrical enclosures.

During operational and maintenance activities on at least some known electrical enclosures, shutters may be moved by hand, either intentionally or inadvertently. In such known electrical enclosures, manual manipulation of shutters is possible due to a lack of locking mechanisms on the shutter to prevent access to exposed voltage line terminals when circuit breakers are not installed. Further, in at least some known electrical enclosures, access to portions containing exposed busbars is possible during insertion of circuit breakers through unlocked shutters revealing exposed voltage line terminals prior to full insertion, i.e., "racking in," of circuit breakers.

BRIEF DESCRIPTION

In one aspect, a shutter interlock device for an electrical enclosure is provided. The shutter interlock device includes a shutter link defining a lock slot, an actuating member rotatably coupled to the electrical enclosure, and a sliding link. The sliding link includes a first end coupled to the actuating member, a second end opposite the first end, and a pin coupled to the second end, where a rotation of the actuating member causes the pin to selectively disengage the lock slot.

In another aspect, an electrical enclosure is provided. The electrical enclosure includes an access panel configured to receive at least one circuit breaker. The electrical enclosure also includes at least one voltage line terminal, and at least one shutter assembly coupled to the electrical enclosure and configured to cover the at least one voltage line terminal when the at least one circuit breaker is absent, and expose the at least one voltage line terminal when the at least one circuit breaker is present. The electrical enclosure further includes a frame member coupled to the electrical enclosure, and a shutter interlock device. The shutter interlock device includes a shutter link defining a lock slot, an actuating member rotatably coupled to the electrical enclosure, and a sliding link. The sliding link includes a first end coupled to the actuating member, a second end opposite the first end, and a pin coupled to the second end, where a rotation of the actuating member causes the pin to selectively disengage the lock slot.

In still another aspect, a method of operating a shutter for an electrical enclosure is provided. The electrical enclosure includes a shutter assembly and a voltage line terminal. The method includes receiving, during a non-operational state of the electrical enclosure, at least one circuit breaker. The method also includes contacting, with the at least one circuit breaker, an actuating member rotatably coupled to the electrical enclosure to rotate the actuating member, where the rotation of the actuating member exerts a first force upon a first end of a sliding link coupled the actuating member. The method further includes causing, via the first force, movement of the sliding link, the sliding link further including a second end opposite the first end and having a pin coupled thereto, the movement disengaging the pin from a lock slot defined in a shutter link rotatably coupled to the shutter assembly. The method also includes unlocking the shutter link to facilitate movement of the shutter assembly away from the voltage line terminal.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The shutter interlock devices and associated systems and methods of use thereof described herein are suited to close and prevent access to voltage line terminals in the busbar portion of electrical enclosures when circuit breakers are removed from electrical enclosures. The embodiments described herein are also suited to prevent intentional or inadvertent manual movement of shutters when circuit breakers are not installed in electrical enclosures. The embodiments described herein are further suited to lock shutters in electrical enclosures to prevent manual access to voltage line terminals of busbar portions of electrical enclosures. The shutter interlock devices and associated systems and methods of use thereof described herein are also suited to prevent exposure of voltage line terminals of busbar portions of electrical enclosures prior to full insertion of circuit breakers. The embodiments described herein are further suited to enhance the safety of operation and maintenance activities on electrical enclosures.

Figure 1:
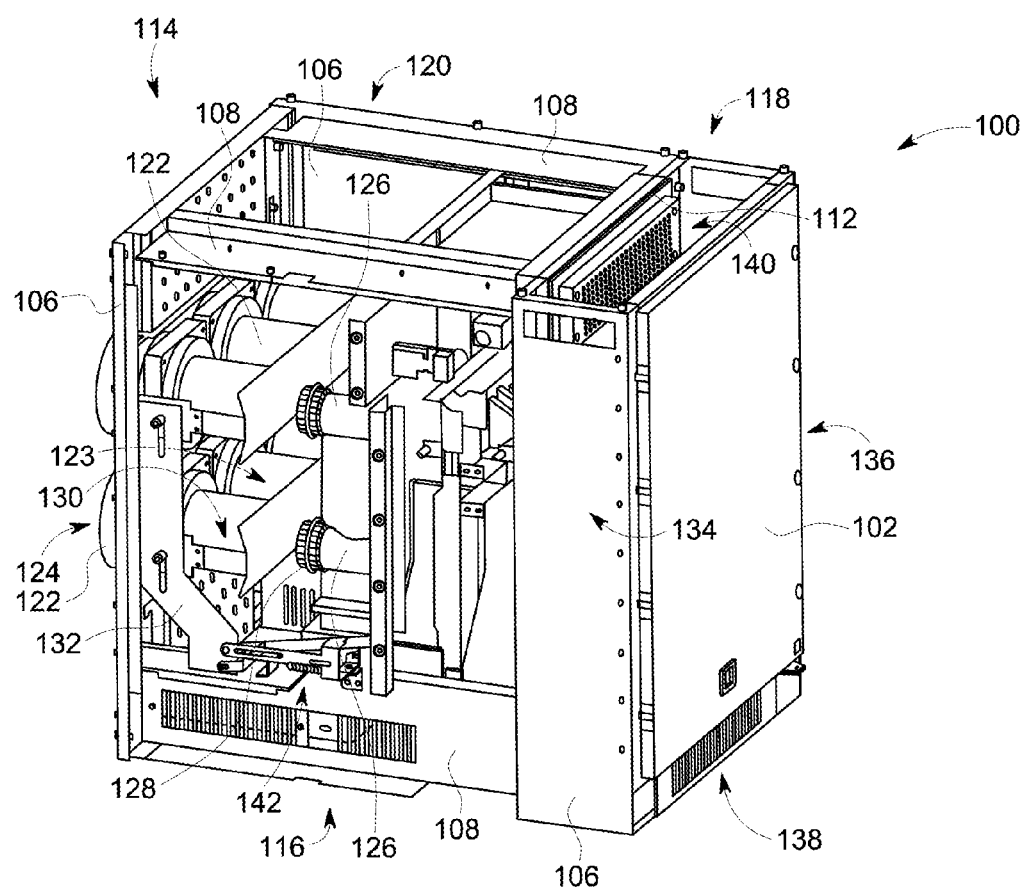
FIG. 1 is a perspective and partial cutaway schematic diagram of an exemplary embodiment of an electrical enclosure.

FIG. 1 is a perspective and partial cutaway schematic diagram of an exemplary embodiment of an electrical enclosure 100. In the exemplary embodiment, electrical enclosure 100 includes a door 102. Electrical enclosure 100 also includes a plurality of exterior panels 106 and a plurality of frame members 108 which provide structural support and protection from external environment conditions. Behind door 102 of electrical enclosure 100 is an access panel 112 including a plurality of receivers (not shown). A circuit breaker (not shown) may be installed into each receiver. Each circuit breaker may also be removed from each receiver during maintenance activities, for example. Electrical enclosure 100 further includes a front portion 116 and a busbar portion 114 coupled to front portion 116. Front portion 116 is divided into at least two regions: a breaker portion 118 behind door 102 and including access panel 112, and a bus connection portion 120 located between breaker portion 118 and busbar portion 114.

Also, in the exemplary embodiment, bus connection portion 120 includes a plurality of busbars (not shown). Each busbar of the plurality of busbars is surrounded by an insulation layer 122. Busbars and insulation layers 122 terminate inside of bus connection portion 120 at exposed voltage line terminals 123. Insulation layers 122 shown in FIG. 1 include bus connections 124 configured to couple to respective busbars located inside of bus connection portion 120. Further, in the exemplary embodiment, bus connection portion 120 includes a plurality of contact arms 126. A sliding connector 128 is coupled to a side of each contact arm 126 facing into bus connection portion 120 toward busbar portion 114. Each sliding connector 128 is configured to alternately engage and disengage each voltage line terminal 123 from one or more electrical loads (not shown) coupled to respective circuit breakers through electrically conductive lines within respective contact arms 126.

Further, in the exemplary embodiment, electrical enclosure 100 includes at least one shutter assembly 130. Shutter assembly 130 is coupled to at least one shutter link 132 located on a first side 134 and a second side 136 of bus connection portion 120. Shutter assembly 130 is configured to cover exposed voltage line terminals 123, as shown and described in further detail below with reference to FIG. 2.

Furthermore, in the exemplary embodiment, electrical enclosure 100 includes at least one shutter interlock device 142. Shutter interlock device 142 is coupled to and between a portion of shutter link 132 and frame member 108 of bus connection portion 120. Also, in the exemplary embodiment, electrical enclosure 100 includes one shutter interlock device 142 coupled to first side 134 frame member 108 of bus connection portion 120. In other embodiments, electrical enclosure 100 includes two shutter links 132 and two shutter interlock devices 142 coupled to both first side 134 and second side 136 frame members 108 of bus connection portion 120. Shutter interlock device 142 is configured to lock shutter assembly 130 in a position covering exposed voltage line terminals 123 to prevent manual access thereto. Shutter interlock device 142 is shown and described in further detail below with reference to FIGS. 2-4.

In operation, in the exemplary embodiment, shutter assembly 130 covers exposed voltage line terminals 123 and sliding connectors 128 are disengaged therefrom when respective circuit breakers are not installed in electrical enclosure 100. Further, when circuit breakers are not installed in electrical enclosure 100, shutter interlock device 142 prevents movement of shutter link 132 and, thus, prevents movement of shutter assembly 130. Upon installation of circuit breakers into electrical enclosure 100, shutter interlock device 142 unlocks, i.e., disengages from, shutter link 132, and shutter assembly 130 moves away from voltage terminal ends 123 and permits coupling of sliding connector 128 thereto. Operation of shutter assembly 130 and shutter interlock device 142 is shown and described in further detail below with reference to FIGS. 2-4.

Figure 2:
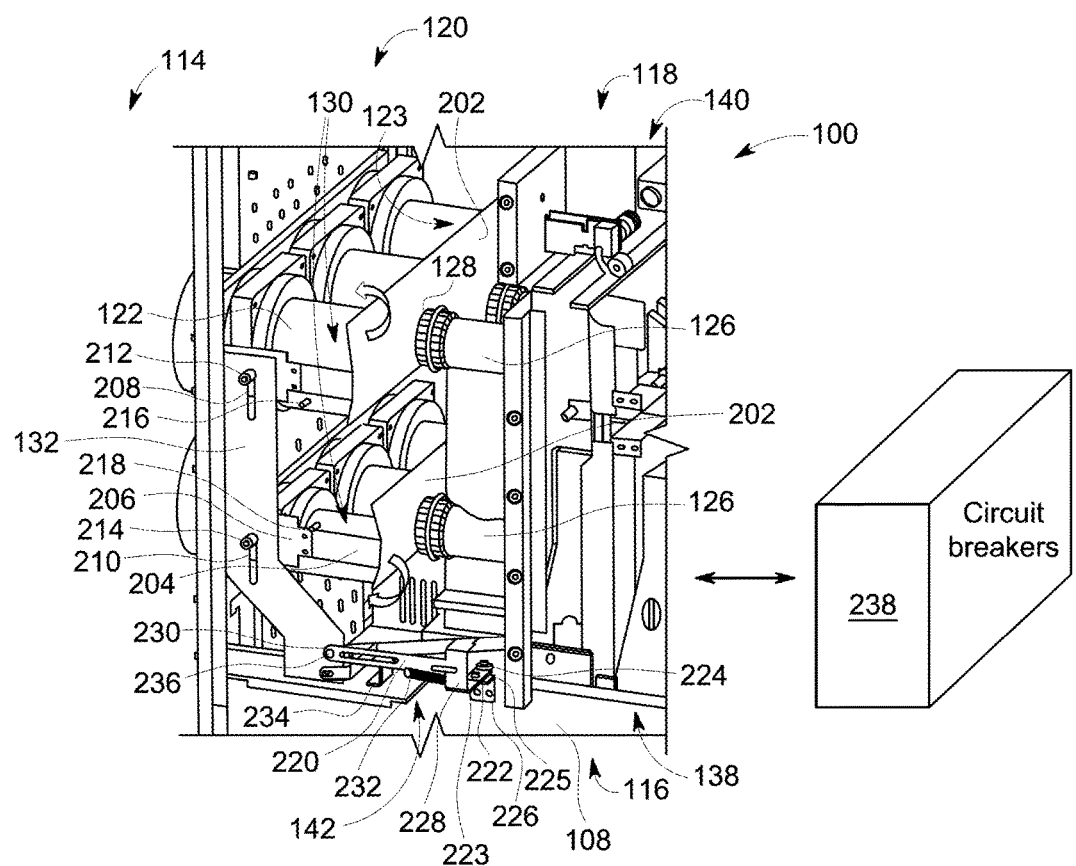
FIG. 2 is a perspective and partial cutaway schematic diagram of an exemplary embodiment of a bus connection portion with installed shutter assembly and shutter interlock device that may be used with the electrical enclosure shown in FIG. 1.

FIG. 2 is a perspective and partial cutaway schematic diagram of an exemplary embodiment of bus connection portion 120 with installed shutter assembly 130 and shutter interlock device 142. In the exemplary embodiment, electrical enclosure 100 includes two shutter assemblies 130, one for each of two rows of voltage line terminals 123. Shutter assembly 130 includes a shutter 202 configured to rotate away from exposed voltage line terminals 123. Also, in the exemplary embodiment, a first shutter 202 proximate top side 140 is configured to rotate both clockwise and counterclockwise, over and away from, respectively, a first row of exposed voltage line terminals 123. A second shutter 202 proximate a bottom side 138 is configured to rotate both clockwise and counterclockwise, away from and over, respectively, a second row of exposed voltage line terminals 123.

Also, in the exemplary embodiment, shutters 202 are rotatably coupled to shutter links 132 through a crossbar 204 and a crossbar bracket 206. Shutter link 132 includes at least one link slot, for example a first link slot 208 and a second link slot 210, defined therethrough. A first crossbar bracket 206 is rotatably coupled to first shutter link 132 through a first shaft 212, and a second crossbar bracket 206 is rotatably coupled to second shutter link 132 through a second shaft 214. Crossbar 204 is coupled to and between crossbar bracket 206 and shutter 202, and represents a lever arm between a rotating coupling point at shaft 212, 214 and shutter 202. Further, in the exemplary embodiment, shutters 202 are curved concavely with respect to door 102, not shown. In other embodiments, not shown, shutters 202 are curved convexly with respect to door 102. In still other embodiments, also not shown, shutter 202 may have any suitable shape to facilitate coverage of exposed voltage line terminals 123 depending on specific applications and configurations within electrical enclosure 100.

Further, in the exemplary embodiment, a first peg 216 is coupled to a first row of insulation layers 122 proximate at least one of first side 134 and second side 136. First peg 216 is located and configured to provide a limit on clockwise movement of first shutter 202. Likewise, a second peg 218 is coupled to a second row of insulation layers 122 proximate at least one of first side 134 and second side 136. Bottom peg 218 is located and configured to provide a limit on counterclockwise movement of second shutter 202.

Furthermore, in the exemplary embodiment, electrical enclosure 100 includes shutter interlock device 142, as shown and described above with reference to FIG. 1. Shutter interlock device 142 includes a sliding link 220 non-rotatably coupled to a pivot plate, for example an actuating member 222, at a first member end 223 thereof. An actuating roller 224 is non-rotatably coupled to a second member end 225 of actuating member 222 opposite first member end 223. Actuating member 222 is rotatably coupled to a pivot bracket 226. Pivot bracket 226 is coupled to bottom side 138 frame member 108. Sliding link 220 includes a first end 228 proximate actuating member 222 and a second end 230 proximate shutter link 132. A bias member 232 including, without limitation, a spring, is coupled to and between actuating member 222 proximate first end 228 and a support plate 234. Support plate 234 is coupled to bottom side 138 frame member 108.

Moreover, in the exemplary embodiment, a pin 236 is coupled to sliding link 220 proximate second end 230. Pin 236 extends perpendicularly away from second end 230 of sliding link 220 toward an interior of bus connection portion 120 by a distance at least substantially equal to a thickness of shutter link 132. Additional feature numbers are indicated in FIG. 2 to facilitate cross-referencing FIG. 2 with FIG. 1 and additional figures to follow.

In operation, in the exemplary embodiment, circuit breakers 238 are removable, i.e., uninstalled, from breaker portion 118 of electrical enclosure 100 (represented by a double-sided arrow in FIG. 2). When circuit breakers 238 are not installed into breaker portion 118, pin 236 is engaged into a lock slot, not shown, on a portion of shutter link 132 proximate bottom side 138. In this locked state, shutters 202 are prevented from moving in either a clockwise or counterclockwise direction away from exposed voltage line terminals 123. Upon insertion, i.e., installation, of circuit breakers into breaker portion 118, at least a portion of circuit breakers 238 contact actuating roller 224. Such contact and continued insertion of circuit breaker 238 into breaker portion 118 results in a torque upon actuating member 222 which results in sliding link 220 moving toward breaker portion 118. Such movement of sliding link 220 results in pin 236 disengaging from lock slot of shutter link 132. Disengagement of pin 236 from shutter link 132 unlocks shutters 202, permitting sliding connectors 128 to engage with and couple to exposed voltage line terminals 123.

Also, in operation of the exemplary embodiment, insertion of circuit breakers 238 into circuit breaker portion 118 of electrical enclosure 100 exerts a force upon sliding connectors 128 toward busbar portion 114. Thus, during insertion of circuit breakers 238, sliding link 220 moves toward busbar portion 114 concurrently with movement of sliding connectors 128 in substantially the same direction. Upon disengagement of pin 236 from shutter link 132, sliding connectors 128 are about to contact shutters 202. Just prior to making contact, however, shutters 202 move away from exposed voltage line terminals 123 and sliding connectors 128 are permitted to couple thereto to close the electrical connection between busbar portion 114, bus connection portion 120, and breaker portion 118. As such, shutter interlock device 142 facilitates having voltage line terminals 123 uncovered by shutters 202 for a relatively minimal amount of time.

Figure 3:
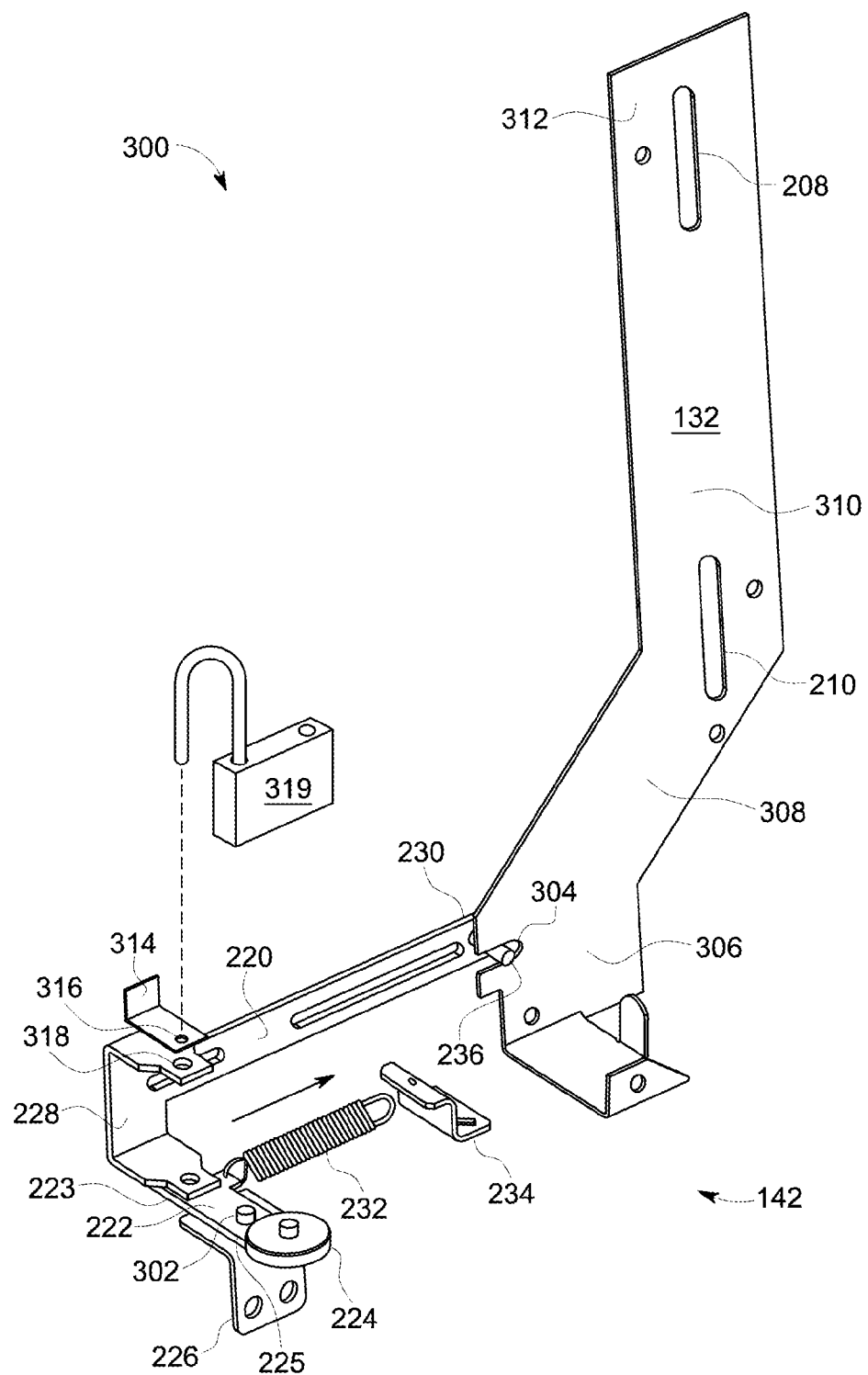
FIG. 3 is a perspective assembly and schematic diagram of an exemplary shutter interlock device, in a locked configuration, that may be used with the electrical enclosure shown in FIGS. 1 and 2.

FIG. 3 is a perspective assembly and schematic diagram of shutter interlock device 142, in a locked configuration 300. In the exemplary embodiment, actuating member 222 is rotatably coupled to pivot bracket 226 at approximately a midpoint of actuating member 222. When circuit breakers 238, not shown, are not installed into electrical enclosure 100, bias member 232 is in a fully retracted, i.e., fully relaxed, position. Full retraction of bias member 232 results in a torque about a pivot point 302 and, thus, a force (represented by a force vector arrow in FIG. 3) exerted upon actuating member 222 proximate first end 228 of sliding link 220. A force in the same direction upon sliding link 220 maintains pin 236 engagement with a lock slot 304 defined in a first portion 306 of shutter link 132. Engagement of pin 236 within lock slot 304 prevents movement of shutter link 132, and therefore prevents movement of shutters 202, as shown and described above with reference to FIG. 2.

Also, in the exemplary embodiment, shutter link 132 further includes an angled portion 308, a second portion 310, and a third portion 312. Angled portion 308 extends from first portion 306 at an approximately 45 degree angle to second portion 310. In other embodiments, not shown, the aforementioned extension of angled portion 308 is at angles other than approximately 45 degrees.

Further, in the exemplary embodiment, shutter interlock device 142, in locked configuration 300, includes a lock bracket 314 coupled to a portion of electrical enclosure 100, not shown. Lock bracket 314 includes a first lock aperture 316 defined through lock bracket 314 proximate first end 228. Furthermore, in the exemplary embodiment, first end 228 includes a second lock aperture 318 defined therethrough. Lock bracket 314 is configured to enable an additional locking mechanism beyond that provided by pin 236. A key or combination lock, or other suitable lock 319 such as a padlock, may be placed through first lock aperture 316 and second lock aperture 318 such that attempted installation of circuit breakers 238 into electrical enclosure 100 does not disengage pin 236 from lock slot 304, thereby providing additional safety assurances to operators of electrical enclosure 100, for example during maintenance activities. Additional feature numbers are indicated in FIG. 3 to facilitate cross-referencing FIG. 3 with foregoing figures and additional figures to follow.

Figure 4:
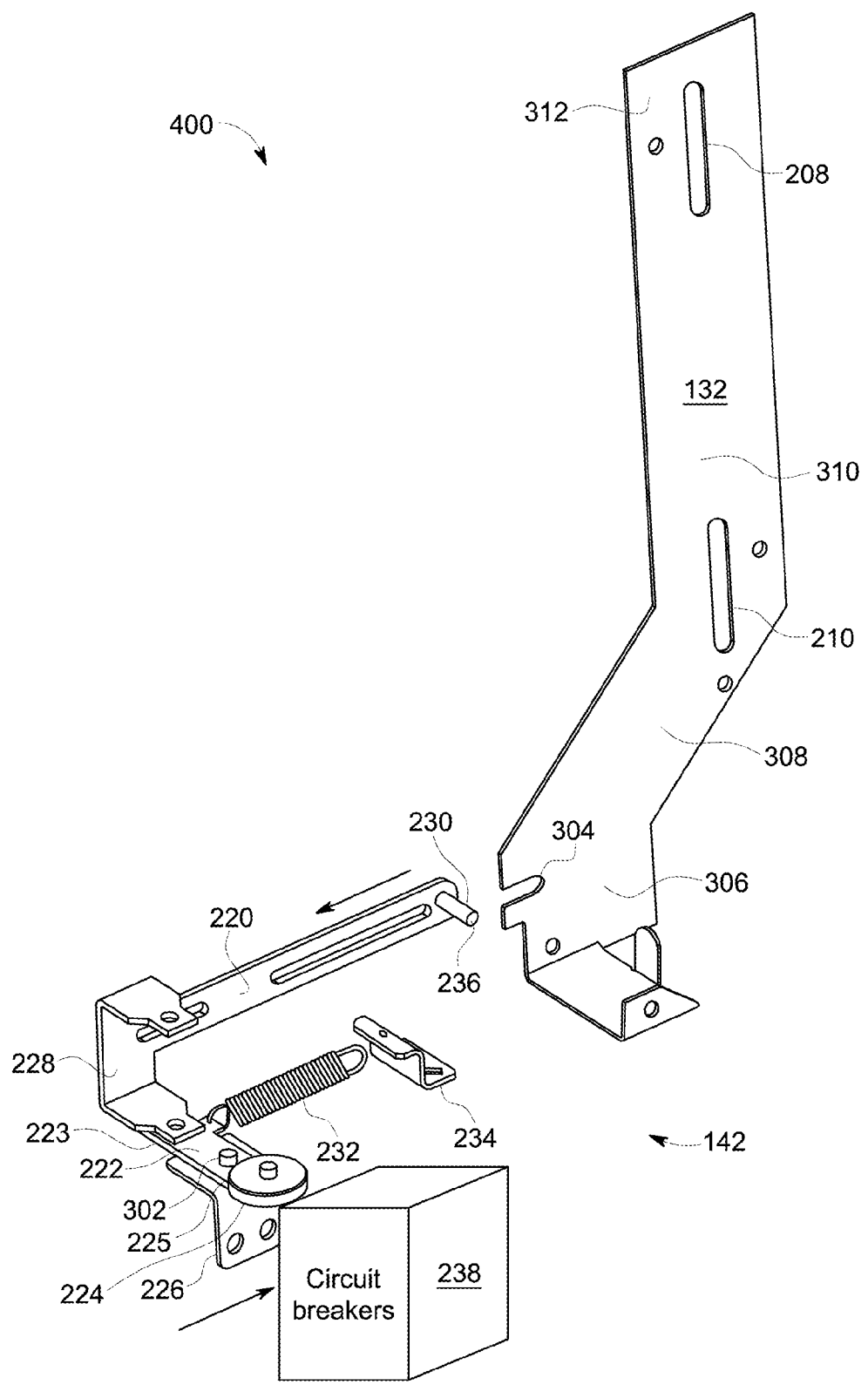
FIG. 4 is a perspective assembly and schematic diagram of an exemplary shutter interlock device, in an unlocked configuration, that may be used with the electrical enclosure shown in FIGS. 1 and 2.

FIG. 4 is a perspective assembly and schematic diagram of a shutter interlock device 142, in an unlocked configuration 400, that may be used with the electrical enclosure shown in FIGS. 1 and 2. In the exemplary embodiment, as circuit breakers 238 are inserted into electrical enclosure 100 for purposes of installation therein, contact of portions of circuit breakers 238 and continued insertion thereof results in force (indicated by a first force vector arrow proximate pivot bracket 226 in FIG. 4), and a torque upon actuating member 222 which results in a force (indicated by a second force vector arrow proximate sliding link 220 in FIG. 4). Sliding link 220 thus moves toward bus connection portion 120, thereby disengaging pin 236 from lock slot 304, as shown and described above with reference to FIG. 2. Disengagement of pin 236 from lock slot 304 unlocks shutters 202, permitting sliding connectors 128 to engage with and couple to exposed voltage line terminals 123, as shown and described above with reference to FIG. 2. Additional feature numbers are indicated in FIG. 4 to facilitate cross-referencing FIG. 4 with foregoing figures.

Figure 5:
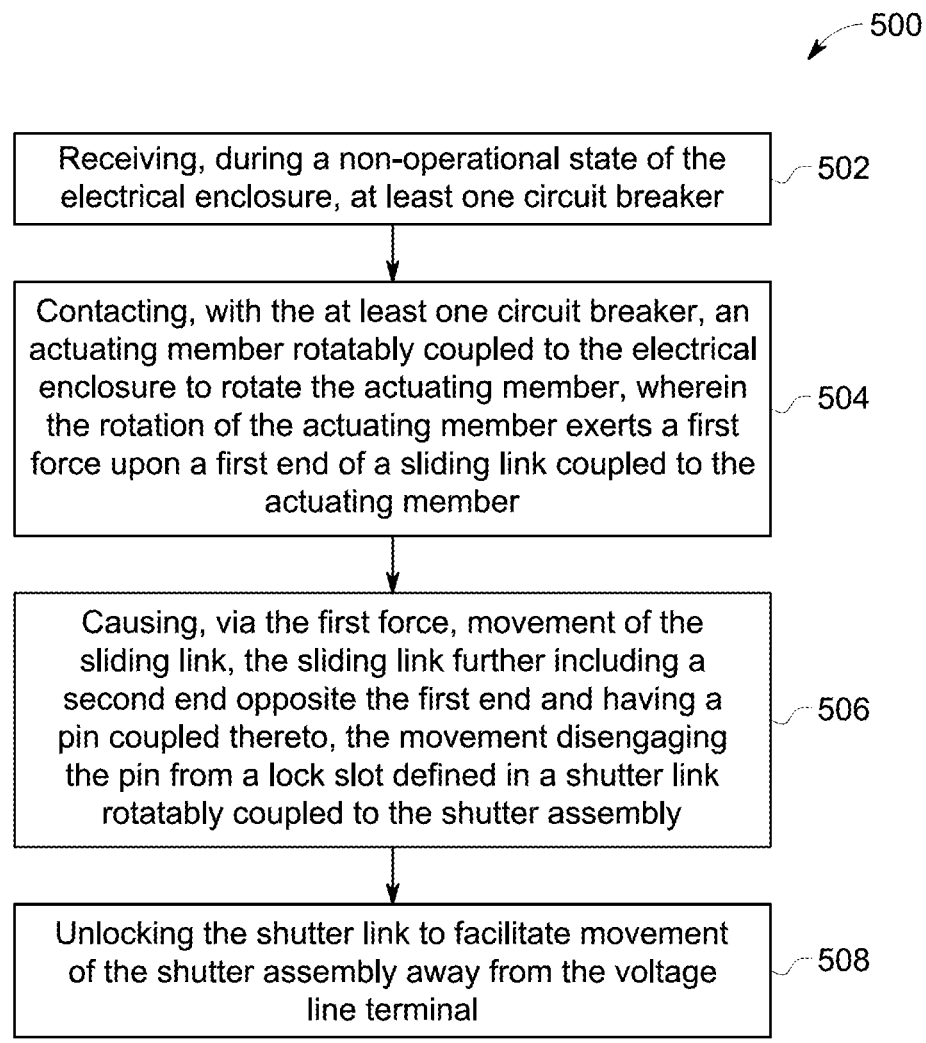
FIG. 5 is a flowchart of an exemplary method of operating a shutter assembly that may be used with the electrical enclosure shown in FIGS. 1 and 2.

FIG. 5 is a flowchart of an exemplary method 500 of operating a shutter assembly 130 that may be used with the electrical enclosure 100 shown in FIGS. 1 and 2. Electrical enclosure 100 includes a shutter assembly, for example shutter assembly 130, and at least one circuit breaker, for example circuit breaker 238. Electrical enclosure also includes at least two operating states: a non-operational state and an operational state. When circuit breakers 238 are not installed in electrical enclosure 100, electrical enclosure 100 is in the non-operational state. When circuit breakers 238 are installed in electrical enclosure 100, electrical enclosure 100 is in the operational state. Method 500 includes a step 502 during which at least one circuit breaker, for example circuit breaker 238 (shown in FIGS. 2 and 4) is received, i.e., inserted, into electrical enclosure 100 during a non-operational state thereof. As shown and described above with reference to foregoing figures, circuit breakers 238 are installed, i.e., "racked in," into breaker portion 118 of electrical enclosure 100. Method 500 also includes a step 504 during which at least a portion of circuit breakers 238 contacts an actuating member, for example actuating roller 224 coupled to actuating member 222, where actuating member 222 is rotatably coupled to electrical enclosure 100, to rotate actuating member 222. The rotation of actuating member 222 exerts a first force upon a first end of a sliding link, for example first end 228 of sliding link 220, where sliding link is coupled to an opposite end, for example first member end 223, of actuating member 222.

Also, in the exemplary embodiment, method 500 includes a step 506 during which first force causes, i.e., effects, movement of sliding link 220, where sliding link 220 further includes a second end, for example second end 230, opposite first end 228 and having a pin, for example pin 236, coupled thereto. Movement of sliding link 220 disengages pin 236 from a lock slot, for example lock slot 304, defined in a shutter link, for example shutter link 132, rotatably coupled to the shutter assembly 130. Shutter assembly 130 is configured to cover a voltage line terminal, for example voltage line terminal 123, when the at least one circuit breaker 238 is absent, and configured expose voltage line terminal 123 when the at least one circuit breaker 238 is present, as shown and described above with reference to foregoing figures. At a step 508, shutter link 132 is unlocked to facilitate movement of shutter assembly 130 away from voltage line terminal 123, as shown and described above with reference to foregoing figures. Unlocking step 512 further facilitates transitioning electrical enclosure 100 from the non-operational state to an operational state.

The above-described embodiments of shutter interlock devices and associated systems and methods of use thereof are suited to close and prevent access to voltage line terminals in the busbar portion of electrical enclosures when circuit breakers are removed from electrical enclosures. The above-described embodiments are also suited to preventing intentional or inadvertent manual movement of shutters when circuit breakers are not installed in electrical enclosures. The above-described embodiments are further suited to locking shutters in electrical enclosures to prevent manual access to voltage line terminals of busbar portions of electrical enclosures. The above-described embodiments of shutter interlock devices and associated systems and methods of use thereof are also suited to preventing exposure of voltage line terminals of busbar portions of electrical enclosures prior to full insertion of circuit breakers. The above-described embodiments are further suited to enhancing the safety of operation and maintenance activities on electrical enclosures.

Exemplary embodiments of the above-described shutter interlock devices and associated systems and methods of use thereof are not limited to the specific embodiments described herein, but rather, components of systems and/or steps of the methods may be utilized independently and separately from other components and/or steps described herein. For example, the methods, systems, and apparatus may also be used in combination with other systems requiring interlock devices, and the associated methods are not limited to practice with only the systems and methods as described herein. Rather, the exemplary embodiments can be implemented and utilized in connection with many other applications, equipment, and systems that may benefit from using the above-described embodiments of the above-described shutter interlock devices and associated systems and methods of use thereof to improve the safety and reliability of operation for protective enclosures in electrical power systems and other related systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shutter interlock device for an electrical enclosure, said shutter interlock device comprising:
    a shutter link defining a lock slot;
    an actuating member rotatably coupled to the electrical enclosure; and
    a sliding link comprising:
        a first end directly coupled to said actuating member;
        a second end opposite said first end; and
        a pin coupled to said second end, wherein a rotation of said actuating member causes said pin to selectively disengage the lock slot;
        wherein the electrical enclosure includes at least one shutter, and wherein said shutter link further defines at least one link slot that is configured to rotatably couple said shutter link to the at least one shutter.

2. A shutter interlock device in accordance with claim 1, wherein said pin extends away from said second end toward an interior of the electrical enclosure.

3. A shutter interlock device in accordance with claim 1 further comprising an actuating roller coupled to said actuating member.

4. A shutter interlock device in accordance with claim 1 further comprising a bias member coupled between said actuating member and the electrical enclosure, wherein said actuating member is rotatable between a first position and a second position.

5. A shutter interlock device in accordance with claim 4, wherein said bias member is configured to maintain said actuating member in the first position until a sufficient force is exerted upon said actuating member and causes said actuating member to rotate to the second position.

6. A shutter interlock device in accordance with claim 4, wherein said bias member is a spring.

7. A shutter interlock device for an electrical enclosure, said shutter interlock device comprising:
   a shutter link defining a lock slot;
   an actuating member rotatably coupled to the electrical enclosure; and
   a sliding link comprising:
   a first end directly coupled to said actuating member;
   a second end opposite said first end; and
   a pin coupled to said second end, wherein a rotation of said actuating member causes said pin to selectively disengage the lock slot; and
   a lock bracket coupled to the electrical enclosure and defining a first lock aperture, wherein a second lock aperture is defined through said sliding link first end, the first and second lock apertures configured to receive a lock therethrough to prevent said pin from disengaging the lock slot.

8. An electrical enclosure comprising:
   an access panel configured to receive at least one circuit breaker;
   at least one voltage line terminal;
   at least one shutter assembly coupled to said electrical enclosure and configured to cover said at least one voltage line terminal when the at least one circuit breaker is absent, and configured to expose said at least one voltage line terminal when the at least one circuit breaker is present;
   a frame member coupled to said electrical enclosure; and
   a shutter interlock device comprising:
   a shutter link defining a lock slot;
   an actuating member rotatably coupled to said electrical enclosure; and
   a sliding link comprising:
   a first end coupled to said actuating member;
   a second end opposite said first end; and
   a pin coupled to said second end, wherein a rotation of said actuating member causes said pin to selectively disengage the lock slot.

9. An electrical enclosure in accordance with claim 8, wherein said pin extends away from said second end toward an interior of said electrical enclosure.

10. An electrical enclosure in accordance with claim 8, wherein said at least one shutter assembly comprises at least one shutter, and wherein said shutter link further defines at least one link slot that is configured to rotatably couple said shutter link to said at least one shutter.

11. An electrical enclosure in accordance with claim 8 further comprising an actuating roller coupled to said actuating member.

12. An electrical enclosure in accordance with claim 8 further comprising a bias member coupled between said actuating member and said electrical enclosure, wherein said actuating member is rotatable between a first position and a second position.

13. An electrical enclosure in accordance with claim 12, wherein said bias member is configured to maintain said actuating member in the first position until a sufficient force is exerted upon said actuating member and causes said actuating member to rotate to the second position.

14. An electrical enclosure in accordance with claim 12, wherein said bias member is a spring.

15. An electrical enclosure in accordance with claim 8 further comprising a lock bracket coupled to said electrical enclosure and defining a first lock aperture, wherein a second lock aperture is defined through said sliding link first end, the first and second lock apertures configured to receive a lock therethrough to prevent said pin from disengaging the lock slot.

16. A method of operating a shutter for an electrical enclosure, the electrical enclosure including a shutter assembly and a voltage line terminal, said method comprising:
   receiving, during a non-operational state of the electrical enclosure, at least one circuit breaker;
   contacting, with the at least one circuit breaker, an actuating member rotatably coupled to the electrical enclosure to rotate the actuating member, wherein the rotation of the actuating member exerts a first force upon a first end of a sliding link coupled the actuating member;
   causing, via the first force, movement of the sliding link, the sliding link further including a second end opposite the first end and having a pin coupled thereto, the movement disengaging the pin from a lock slot defined in a shutter link rotatably coupled to the shutter assembly; and
   unlocking the shutter link to facilitate movement of the shutter assembly away from the voltage line terminal.

17. A method in accordance with claim 16 further comprising:
   removing, during an operational state of the electrical enclosure, the at least one circuit breaker from the electrical enclosure.

18. A method in accordance with claim 17 further comprising:
   relaxing a bias member coupled between the actuating member and the electrical enclosure; and
   rotating the actuating member about a pivot point to exert a second force upon the first end of the sliding link in a direction opposite the first force.

19. A method in accordance with claim 18 further comprising:
   causing, via the second force, movement of the sliding link; and
   engaging the lock slot with the pin to lock the shutter assembly in a position covering the voltage line terminal.

* * * * *